US 10,705,679 B1

(12) United States Patent
Galvan et al.

(10) Patent No.: US 10,705,679 B1
(45) Date of Patent: Jul. 7, 2020

(54) AUTOMATIC CONFIGURATION OF INTERACTIVE VIRTUAL OBJECTS IMPLEMENTED ON AUXILIARY DEVICES

(71) Applicant: SHORETEL, INC., Sunnyvale, CA (US)

(72) Inventors: Christopher Galvan, Round Rock, TX (US); Dieter W. Rencken, Half Moon Bay, CA (US); Glen K. Okita, Los Altos, CA (US); Robert R. Glaser, San Jose, CA (US); Dale C. Tonogai, Los Altos, CA (US)

(73) Assignee: Mitel Networks, Inc. DE (US)

( * ) Notice: Subject to any disclaimer, the term of this patent is extended or adjusted under 35 U.S.C. 154(b) by 835 days.

(21) Appl. No.: 14/822,236

(22) Filed: Aug. 10, 2015

(51) Int. Cl.
*G06F 3/0481* (2013.01)
*G06F 12/1009* (2016.01)
*G06F 13/42* (2006.01)
*G06F 13/28* (2006.01)

(52) U.S. Cl.
CPC ...... *G06F 3/04817* (2013.01); *G06F 12/1009* (2013.01); *G06F 13/28* (2013.01); *G06F 13/4221* (2013.01); *G06F 2212/152* (2013.01)

(58) Field of Classification Search
CPC .................................................. G06F 3/04817
See application file for complete search history.

(56) References Cited

U.S. PATENT DOCUMENTS

| | | | |
|---|---|---|---|
| 7,940,906 B2 | 5/2011 | Basart et al. | |
| 7,991,150 B2 | 8/2011 | Basart et al. | |
| 8,553,875 B2 | 10/2013 | Basart et al. | |
| 10,546,469 B2 * | 1/2020 | Peterson | G08B 3/10 |
| 2001/0046862 A1 * | 11/2001 | Coppinger | G06F 8/65 455/435.1 |
| 2007/0096947 A1 * | 5/2007 | Basart | H04M 1/23 341/22 |
| 2007/0171098 A1 | 7/2007 | Basart et al. | |
| 2011/0211496 A1 | 9/2011 | Basart et al. | |
| 2012/0038489 A1 * | 2/2012 | Goldshmidt | G08G 1/163 340/903 |
| 2014/0040781 A1 * | 2/2014 | Epstein | H04N 5/268 715/753 |
| 2015/0172743 A1 * | 6/2015 | Itagaki | G08C 17/00 725/56 |

(Continued)

FOREIGN PATENT DOCUMENTS

EP 1763207 3/2007

*Primary Examiner* — Beau D Spratt (57) ABSTRACT

A system can include at least one auxiliary device comprising a plurality of user interface components responsive to user inputs. A host device can include a link interface configured to communicate with each auxiliary device via a communication link. The host device also includes configuration logic to automatically configure each auxiliary device to implement at least one of a plurality of virtual interactive pages, which is assigned based on the number of auxiliary devices connected to the host device. Each of the virtual interactive pages is programmed to associate a discrete set of actions or events with specified user interface components of the respective auxiliary device to which the virtual interactive page is assigned. The host device can execute a selected one of the actions or events in response to activation of a corresponding one of the user interface components.

25 Claims, 7 Drawing Sheets

(56) References Cited

U.S. PATENT DOCUMENTS

2016/0021155 A1\* 1/2016 Sawato ............... G06F 3/04817
455/456.1
2016/0139575 A1\* 5/2016 Funes ................. H04L 12/2834
700/275

\* cited by examiner

AUTOMATIC CONFIGURATION OF INTERACTIVE VIRTUAL OBJECTS IMPLEMENTED ON AUXILIARY DEVICES

TECHNICAL FIELD

This disclosure relates to configuring virtual interactive objects that may be implemented on one or more physical devices.

BACKGROUND

Various types of systems employ auxiliary (e.g., peripheral) devices to provide additional functionality to a given host device. In one example, button boxes (e.g., also known as key expansion modules) can provide additional buttons and functionality to a phone system such as for an operator attendant. In other examples, a plurality of monitors can be connected to a computer as auxiliary devices for displaying execution of application and related user interactions. How to configure what is displayed and types of user interaction that can be implemented with respect to each auxiliary device is an ongoing issue.

SUMMARY

This disclosure relates generally to configuring virtual interactive objects for implementing on one or more auxiliary devices.

As one example, a system can include at least one auxiliary device comprising a plurality of user interface components responsive to user inputs. A host device can include a link interface configured to communicate with each auxiliary device via a communication link. The host device also includes configuration logic to automatically configure each auxiliary device to implement at least one of a plurality of virtual interactive pages, which is assigned based on the number of auxiliary devices connected to the host device. Each of the virtual interactive pages is programmed to associate a discrete set of actions or events with specified user interface components of the respective auxiliary device to which the virtual interactive page is assigned. The host device can execute a selected one of the actions or events in response to activation of a corresponding one of the user interface components.

As another example, a host device includes memory to store data and instructions. The data includes virtual page assignment data that specifies a plurality of discrete virtual user interactive objects, each of the discrete virtual objects defining a different operating context that includes a set of discrete actions or events to execute in response to a user input. At least one processor can access the memory and execute the instructions stored therein. The instructions can include configuration logic to assign the discrete virtual objects to at least one auxiliary physical device based on the virtual page assignment data as determined based on the number of physical devices connected to the host device via a communication link.

As another example, a method can include storing in memory of a host device a plurality of discrete virtual pages that each represents a different set of executable actions or events responsive to respective user inputs. The method includes identifying each auxiliary device that is connected to the host device via a communication link. The method further includes determining assignment data that specifies which of the plurality of discrete virtual pages is assigned to each identified auxiliary device based on the number of auxiliary devices. Each identified auxiliary device is programmed to implement at least one of the plurality of discrete virtual pages based on the assignment data, wherein each identified auxiliary device associates a respective set of the executable actions or events with respective user interface components. The method also includes executing a selected one of the actions or events in response to the host device receiving an event signal from a given auxiliary device via the communication link representing activation of a corresponding user interface component.

DETAILED DESCRIPTION

This disclosure relates to systems and methods for configuring virtual interactive objects that are implemented on one or more auxiliary devices associated with a given host device. Each of the auxiliary devices can be connected to the host device via a communication link. The host device can employ the communication link to configure each of the auxiliary devices for implementing one or more of the plurality of virtual interactive objects, in which the configuration of virtual objects at each auxiliary device is determined based on the number of auxiliary devices associated with the host device. The number of auxiliary devices is variable (i.e., auxiliary devices can be added or removed). Each auxiliary device thus can be assigned one or more of the virtual objects that is to be available at such auxiliary device. When two or more virtual interactive objects are to be available for a given auxiliary device, one of the objects will be active at a given time, which can be selectable at the auxiliary device in response to a corresponding selection user input at a user interface component.

As one example, each virtual object can define a discrete set of one or more actions represented by user interface components implemented with respect to the auxiliary device. In response to a user input activating a user interface component for an active page implemented thereon, the auxiliary device can provide a corresponding event signal to a host device identifying the user interface component activated in response to the user input. In response, the host can execute the corresponding action associated with the user interface component and provide a corresponding event update back to the auxiliary device based on the current state of the action being executed. As auxiliary devices are added or removed with respect to the host device, the host device can modify or reconfigure the virtual objects according to the number and arrangement of remaining auxiliary devices.

As a further example, for a button box associated with a given telephone in a communication system, the virtual objects can correspond to virtual pages, where each virtual page represents a set of actions that can be selectively activated in response to a user input at the auxiliary device where the respective page is active. Each virtual page and its associated actions are active and accessible at only one button box. The accessibility of a given virtual page which depend on the configuration implemented by the host device with respect to the set of virtual pages. As an example, if only one button box is installed and connected to a host telephone device, such button device will display one page of buttons that are active, while each other virtual page of buttons are accessible and can be activated in response to a user input selection. If more than one button box is installed, the pages can be distributed across each of the auxiliary devices such as in a preconfigured arrangement or as provided in response to a user input. In some examples, the last button box in a given sequence can be configured with a set of virtual pages including any virtual pages that have not associated with another physical auxiliary device.

Figure 1:
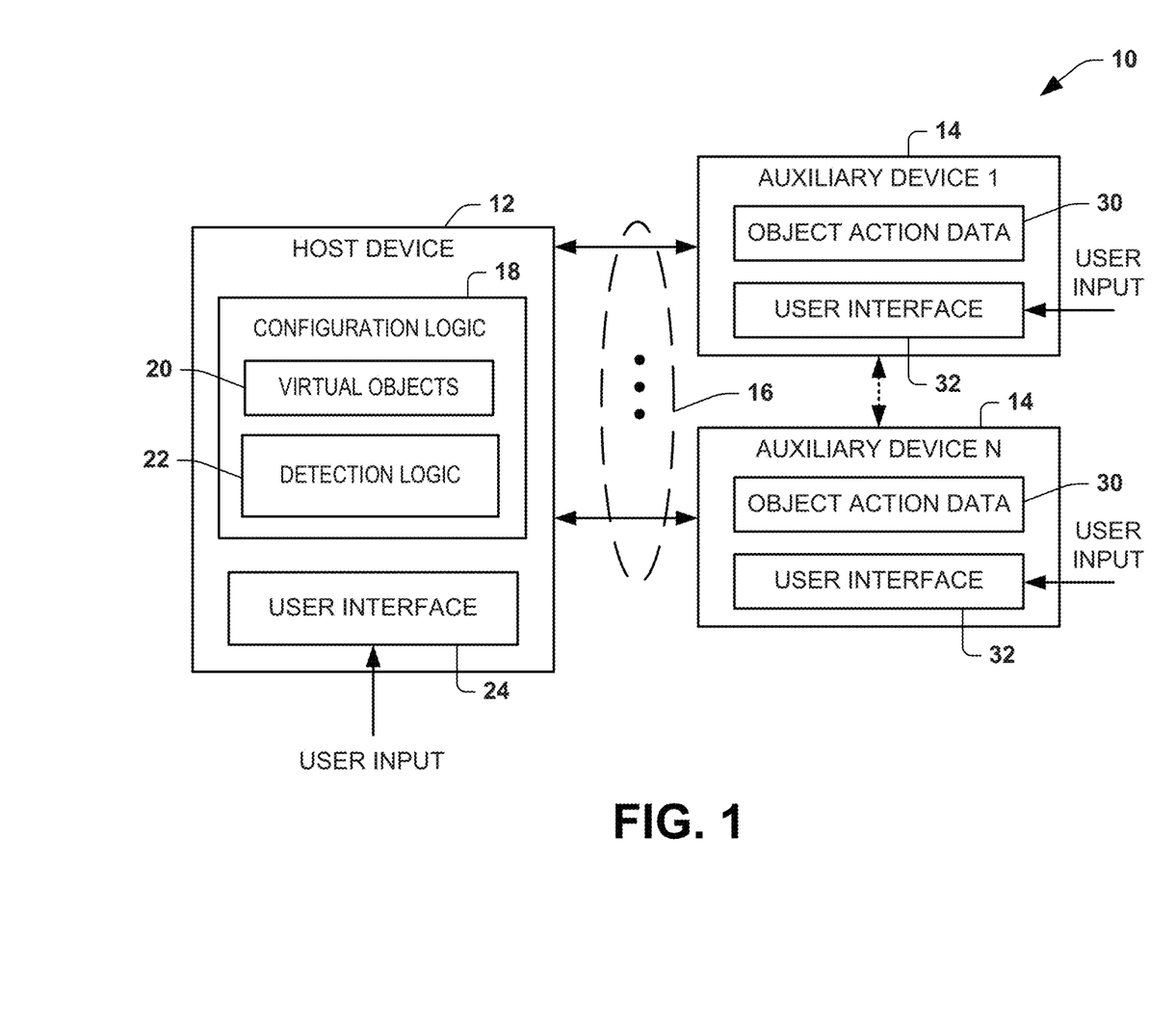
FIG. 1 depicts an example of a system for automatic configuration of virtual objects, such as virtual pages.

FIG. 1 depicts an example of a system 10 for configuring interactive virtual objects 20 to be implemented across one or more auxiliary devices 14. Each virtual object 20 can correspond to a virtual page of preprogrammed events and/or actions that can be activated responsive to user inputs at respective auxiliary device implementing the respective virtual page. Each of the virtual objects (e.g., pages) can be separately and individually assigned to a different one of the auxiliary devices, as disclosed herein.

The system 10 includes a host device 12 that is connected to one or more of the auxiliary devices 14 via a communication link 16. There can be any number of N auxiliary devices 14, where N is a positive integer. The host device 12 includes configuration logic 18 to determine which of the plurality of virtual objects 20 to assign to one or more of the auxiliary devices 14. For instance, each of the virtual objects 20 can be stored in memory as separate instances of a common data structure. The virtual object data 20 specifies a plurality of discrete virtual objects, each of which virtual objects provides an abstraction of a defined class of respective preprogrammed events or actions executable responsive to user inputs. As mentioned, the events or actions in a given instance of the virtual object can be invoked in response to a user input at a given one of the auxiliary devices 14 to which the virtual object containing the events or actions have been assigned and is active.

In the operating context of a telephone system, for example, the auxiliary devices 14 can correspond to key expansion modules or button boxes and the user inputs can correspond to activating a button or other user interface component that is associated with a predefined function or action that is executable by the host. In the context of a general computing system, the virtual objects can correspond to virtual desktops, each of which can be separately assigned to a respective monitor auxiliary device that is connected to the host computing device and the user input can correspond to activation of any of the functions or methods executable within the respective virtual desktop.

The host device 12 can also include detection logic 22 that can detect each auxiliary device 14 that is connected to the host device via the communication link 16. The communication link 16 can include a physical connection such as an electrical or optical bus that can provide for bidirectional communication of information between the host device 12 and each auxiliary device 14. In other examples, the communication link 16 can be implemented as a wireless link such as a short range communication (Bluetooth or the like) or another wireless communication technology such as one of the 802.11x standards. The detection logic 22 thus can identify each auxiliary device that has been registered for operation with the host device 12.

In addition to identifying the number of auxiliary devices 14, the detection logic 22 may also be programmed to determine the type and/or arrangement of connections of the auxiliary devices with respect to the host device 12. The arrangement, for example, can correspond to a sequence such as a temporal order in which the auxiliary devices were connected. Alternatively or additionally, the detection logic can ascertain a spatial proximity of the auxiliary devices relative to the host device 12, which can be used to determine a spatial sequence or order for the auxiliary devices. Based upon the detected arrangement and number of auxiliary devices 14 connected with the host device 12, the configuration logic 18 selectively assigns one or more of the discrete virtual objects to each of the auxiliary devices 14. That is, the configuration logic 18 can control the assignment and distribution of the virtual objects to the auxiliary devices 14 based on the number and how the auxiliary devices 14 are connected to the host device 12 via the link 16. For example, the configuration logic 18 can determine an ordered sequence of the auxiliary devices 14 and use this ordered sequence to define which of the virtual pages is assigned to each of the respective auxiliary devices.

The host device 12 can also include a user interface 24 that can activate one or more actions at the host device in response to a user input. For example, the user interface 24 can provide a human machine interface of physical buttons that can be activated to selectively implement predefined actions associated with each user interface component. The actions can include implementing functions at the host device and/or actions to establish, modify or terminate a communication session with one or more other endpoint device. For example, the user interface 24 can implement a set of preprogrammed events or actions, which may be another instance of a virtual object data structure, activated in response to user inputs at the host device.

Each of the auxiliary devices 14 can also include object action data 30 that defines a set of actions that can be implemented at the auxiliary device 14 in response to a user input activating the corresponding action. For example, the object action data can correspond to a set of actions that have been programmed for each of a plurality of user interface components (e.g., buttons) that are implemented via a user interface 32 of the auxiliary device 14. The user interface 32 thus can include physical buttons or another form of user interface, such as a touch screen, mouse, keyboard or the like, through which a user can activate associated actions or events from an active virtual page implemented at each auxiliary device. In response to a user input to activate a selected event or action at a given auxiliary device 14, the given auxiliary device provides corresponding signaling via the communication link 16 to command the host device 12 to implement the corresponding action that was selected.

The host device 12 can provide event updates back to the auxiliary device 14 via the communication link to specify the current status for the requested event, which can be presented as a visible indicator at or near the user interface component (e.g., button) of the auxiliary device that was activated. In addition to status and event updates for user interface components activated at the auxiliary device, the host device can provide other event and status updates to each of the auxiliary devices commensurate with other events and actions occurring within the communication system 10. In this way, each auxiliary device 14 can present current relevant status indicators via its user interface components, such as including graphics, text, LED indicators or the like, in response to events initiated at each auxiliary device or elsewhere in the system 10.

Figure 2:
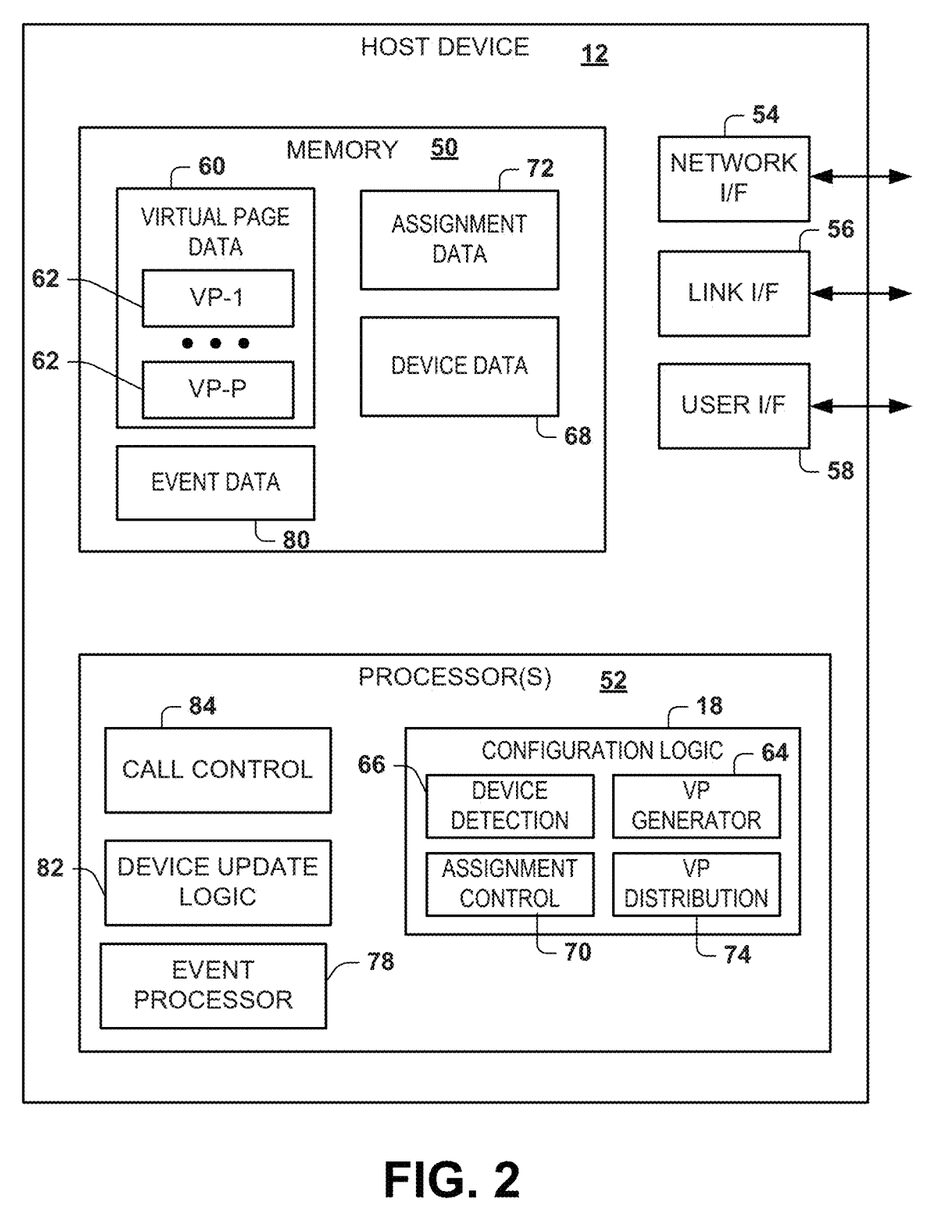
FIG. 2 depicts an example of a host device that can automatically configure virtual objects for one or more associated auxiliary devices.

FIG. 2 depicts an example of a host device 12 programmed to automatically configure a set of virtual objects (e.g., virtual pages) for a number of one or more auxiliary devices (e.g., devices 14 in FIG. 1). In the example of FIG. 2, the host device 12 includes a memory 50 that stores data and instructions for performing the functions and methods disclosed herein. The memory 50 can be implemented, for example, as volatile memory (e.g., random access memory), nonvolatile memory (a hard disk drive, a solid state drive, flash memory or the like) or a combination thereof. The memory 50 stores data associated with the configuration and update of information that is communicated with respect to one or more auxiliary devices.

The host device 12 also includes one or more processors 52 (e.g., having one or more processing cores) that can access the memory 50 and execute instructions stored therein. As an example, the host device 12 can be implemented as including a telecommunication device, such as a telephone (e.g., a desktop telephone or other device), that can include a plurality of interfaces. In the example of FIG. 2, the host device includes a network interface 54, a communication link interface 56 and a user interface 58. For instance, the network interface 54 can be configured to connect the host device 12 to a corresponding network. The network could be a public network (e.g., the Internet and/or a public switched telephone network), a private network (e.g., local area network or intranet) or combination thereof.

The link interface 56 provides access to a communication bus for exchange of information between the host device 12 and one or more auxiliary devices that are connected with the host device 12. As disclosed herein, the link interface can provide communication via an electrically conductive link, an optical link, and/or a wireless link. In some examples, there can be more than one link interface to couple the host device 12 to one or more auxiliary devices, each of which may connect to the host device over a different communication link. As an example, the link interface can execute a communication protocol corresponding to a universal serial bus (USB) standard, which provides a connection, communication and power supply between the host device and one or more auxiliary devices 14. Other types of connections and communication protocols can also be implemented by the link interface 56 (e.g., peripheral component interconnect (PCI), RS-232 or the like).

The user interface 58 provides a human-machine interface through which a user can interact with user interface components implemented by the host device 12. As an example, the user interface components of the host device 12 can include an input device (e.g., buttons), an output device (e.g., a display), as well as input/output (I/O) devices (e.g., illuminated buttons, touch screen). A user can interact with an input or I/O devices to activate corresponding functions or methods that have been assigned to each of the respective user interface components. For example, a button user interface component may be a physical electrical switch that may be activated to create an open circuit or closed circuit condition, which can be monitored via the user interface 58 to trigger a corresponding event at the host device 12. In other examples, the user interface component may correspond to a graphical user interface (GUI) control element that can be selectively activated in response to a user input (e.g., activation via a mouse, keyboard or other user input device or a touch screen apparatus). A corresponding display screen may also be associated with the user interface 58 to provide information associated with the available functions that can be implemented with respect to the host device 12.

In the example of the FIG. 2, the memory 50 includes virtual page data 60 that specifies the plurality of discrete virtual pages (VP-1 through VP-P, where P is a positive integer denoting the number of virtual pages) that can be implemented with the host device 12 and one or more auxiliary devices that can be connected to the host device 12 via the link interface 56. Each of the virtual pages 62 can define a class or set of preprogrammed discrete actions that are executable in response to corresponding user inputs. Each of the virtual pages 62 can be stored in memory 50 as an instance of a corresponding data structure, which can be independently transmitted and accessed by a corresponding device (e.g., the host device 12 or an auxiliary device 14) to provide a set of programmable discrete actions that can be triggered for each respective page that is active for a given device. Stated differently, one virtual page can include a set of preprogrammed actions or events and each other of the plurality of pages can define another set of different actions or events, each of which is stored as a corresponding instance of a programmable data structure as part of the virtual page data 60. In some examples, if desired or programmed by a user, the same action or event can be implemented across two or more different virtual pages. Thus, the actions and events stored in each instance of the virtual page data structure can be user programmable.

The virtual page data 60, including each of the corresponding data structure instances 62, can be generated in response to user input instructions provided via configuration manager that may be implemented via the user interface 58 at the host device 12. Alternatively or additionally, one or more virtual pages 62 can be programmed in response to user input instructions provided via configuration manager that is implemented remotely from the host device with the virtual page data received at the host device from the configuration manager via the network interface 54. For instance, the host device 12 can receive a set of virtual page configuration parameters for each of the virtual pages 62. The virtual page configuration parameters can be provided as a list of parameters that defines events or actions associated with each user interface component, which may be on the host device 12 or auxiliary device, according to how the virtual pages are assigned.

The configuration logic 18 can include a virtual page generator 64 programmed to generate the virtual page data 60. For example, the virtual page generator 64 is programmed to parse the virtual page configuration parameters programmed for each virtual page and to store the configuration parameters in a corresponding instance of virtual page data structure 62 for such page. Each instance of the virtual page data structure 62 thus specifies a discrete set of events or actions to trigger in response to user activation of corresponding user interface components. The user interface components thus can be selectively implemented on a given respective physical devices, including the host device 12 and one or more auxiliary devices 14.

The configuration logic 18 can also include device detection function 66 to detect auxiliary devices 14 that are connected to the host device via the link interface 56. The device detection function 66 can store information about the connections for the auxiliary devices in memory 50 as device data 68. For example, the device detection function 66 determines the number of auxiliary devices automatically based upon signally between the host device and each associated auxiliary device via the communication link and the link interface 56. Additionally or alternatively, the number of auxiliary devices can be specified in response to a user input, such as via user interface 58. Thus, the device data can include data specifying the number of auxiliary devices connected to the host device.

In addition to detecting the number of auxiliary devices, in some example, the device detection function 66 can ascertain how each of the auxiliary devices is connected to the host device 12. The manner of connection, for example, can include the types of physical connections between each auxiliary device and the host device 12. For instance, the auxiliary device can be connected directly to the hose device 12 or it can be connected to another auxiliary device (e.g., as part of a daisy chain or other connection configuration).

Device detection function 66 can also be programmed to ascertain a sequence for two or more auxiliary devices connected to the host device 12. For example, the sequence of devices can correspond to a temporal order according to the relative timing of when the auxiliary devices are connected to the host device. The temporal order can be determined based on time stamps or other temporal identifiers used to denote when each auxiliary device is connected with the host device 12. Alternatively, the sequence can correspond to a spatial configuration of the auxiliary devices with respect to the host device 12. For example, the auxiliary devices can be connected to each other in a linear arrangement (e.g, row) adjacent to the host device, such that one device is closes to the host and another is located furthest from the host device. The detection function 66 thus can specify the sequence based on the spatial configuration, which can be user-specified or determined from the connections among the devices.

The Information about the type and/or sequence of auxiliary devices connected to the host device can be stored as part of the device data 68. The device detection function 66 can store the device data 68 in a memory 50 to specify a unique identifier for each auxiliary device as well as its sequence identifier with respect to the host device. As mentioned, the sequence identifier can specify wherein in the sequence of the respective auxiliary devices each respective registered auxiliary device exists.

The configuration logic 18 also includes an assignment control function 70 that generates assignment data 72 based on the device data 68. The assignment data 72 specifies an assignment of each of the virtual page or pages 62 to one or more of the auxiliary devices 14. As mentioned, depending on the number of virtual pages, the number of auxiliary devices and/or the sequence of auxiliary devices, as provided by the device data 68, the assignment control function 70 may assign different auxiliary devices more than one virtual page.

As one example, assuming there are three auxiliary devices and four virtual pages in addition to the virtual page that is assigned to host device 12, the assignment control function 70 may assign each of the first and second auxiliary devices a single virtual page and the third auxiliary device in the sequence can be assigned the remaining two virtual pages. For the third auxiliary device, one virtual page will be an active page operating on the auxiliary device and the other virtual can be available and accessible in response to activation of a user input component (e.g., button) programmed to selectively toggle between the available virtual pages at such device. Thus, in contrast to simply assigning buttons that are assigned in individual order among the available buttons in the auxiliary devices, corresponding groups of actions and events can be organized into discrete virtual pages that can be selectively assigned to one or more auxiliary devices automatically by the assignment control 70, depending upon the number of auxiliary devices that are connected via the communication link.

To program the auxiliary devices, the configuration logic further can employ virtual page distribution function 74 to send the virtual page data structures 62 to one or more auxiliary devices based on the assignment data 72. For instance, the distribution function 74 can access each of the virtual page data structures 62 from the memory 50 and provide configuration messages via the link interface 56 for sending one or more virtual page data structures 62 to each auxiliary device based on the assignment data 72. For example, the virtual page distribution function 72 can employ a messaging protocol to package the virtual pages along with address information that specifies the device identifier so that the corresponding virtual pages are selectively distributed based on the assignment data to each of the auxiliary devices via the communication link. In this way, each corresponding virtual page data structure 62 can be distributed and stored in each auxiliary device along with the associated parameters for displaying the information to enable each respective auxiliary device to implement a human-machine interface for a different set of events or actions.

The host device 12 also includes an event processor 78 to receive and process device event signals received via the link interface 56 from one or more auxiliary device connected to the communication link. Accordingly, once an instance of virtual page data structure 62 has been stored at a given auxiliary device, event signals triggered by user inputs at the given auxiliary device can be can be detected by the event processor 78. For example, a device event signal from a given auxiliary device can be received at the link interface 56 in response to user input associated with the given auxiliary device (e.g., pressing a button or other user interface component). The device event signal from the given auxiliary device, for example, specifies an enumerated identifier for a given auxiliary device from which the device event signal originated, an identifier for the particular virtual page on which the activated button exists for the virtual page as well as an identifier the particular button (e.g., a button ID) that is activated in response to the user input. This button identification information can be employed by the event processor 78 to convert the device event signal into a corresponding command and executable action that can be implemented by the processor 52. The event processor 78 thus can execute (or trigger execution of) a corresponding action in response to each device event signal that it receives via the link interface 56.

Device event signals can also originate at the host device 12 in response to event signals received via the user interface 58. For example, device event signals provided in response to the user interface 58 at the host device 12 can correspond to pressing buttons or performing other user interface operations on a telephone device corresponding to the host device 12. The user interface operations can include physically interacting with a keypad, preprogrammed buttons (e.g., similar to buttons on an auxiliary device) to which predefined functions have been programmed. Thus, whether from an auxiliary device or originating at the host device 12, the event processor 78 converts each event signal to a corresponding command, such as having an associated numeric ID, for triggering a given action or event that has been programmed.

The event processor 78 can store event data 80 in the memory 50 associated with each action that is performed in response to a user input. The event data 80 thus can specify a state that is associated with a given event, which further may map to a corresponding user interface component at the host device 12 or at an auxiliary device 14 connected to the host device via the communication link. Examples of some event information that can be displayed associated with user interface components at a given device (e.g., host or auxiliary device) can include icons and/or labels to indicate different status (e.g., on- or off-hook, connected to a conference call, monitored extension has unheard voicemail, monitored extension is connected in a call, monitored extension has a bridged call etc.).

For example, in some instances activation of the button can be to initiate a telephone call or other sort of communication session to another user or endpoint device. In such instances, the event processor 78 can employ call control 84 to perform signaling via the network interface 54 to the recipient of the call. For example, the call control 84 can employ signaling via the network interface to set up and establish the call between the host device 12 and the end point specified by the device event signal. In other instances, the call control 84 can transfer an incoming call to the endpoint or perform other actions with respect to the call, such as setting up or tearing down corresponding call legs. Those skilled in the art will understand and appreciate other functions and controls that can be implemented by the host device 12 related and in response to device event signals provided in response to activating user interface components at the host device or one of the auxiliary devices connected to the host device.

After the initial distribution of assigned virtual pages to one or more auxiliary devices, the configuration logic 18 and its respective functions 64,66, 70 and 74, can continue run as a background process such as to accommodate changes in the auxiliary devices connected to the host device 12. For instance such changes can include adding another auxiliary device to the communication link or removing an existing auxiliary device from the communication link. A change may also result due to a malfunction of a connected auxiliary device, which is perceived as a removal of such malfunctioning device. In response to the device detection function 66 detecting any such change, the assignment control function 70 reassigns and the virtual page distribution function redistributes the virtual pages to the currently associated auxiliary devices. The redistribution of virtual pages can include the entire set of virtual page data structures 62 or, in other examples, the distribution function 74 can just send configuration messages to the affected auxiliary devices.

Thus, for an example where a user has three auxiliary button boxes attached to a given telephone but desires to reduce clutter, a user can disconnect one or more button boxes and the assignment control 70 will determine the number of buttons boxes remaining and, in turn, redistribute the virtual pages according to the number remaining auxiliary devices still connected to the host device 12. Since all of the user interface components and associated parameters and displays are maintained as discrete virtual pages, regardless of to which auxiliary device a given virtual page is assigned, the user interface components on that page will look and feel the same to the user, thereby facilitating use and access of the associated interfaces.

Figure 3:
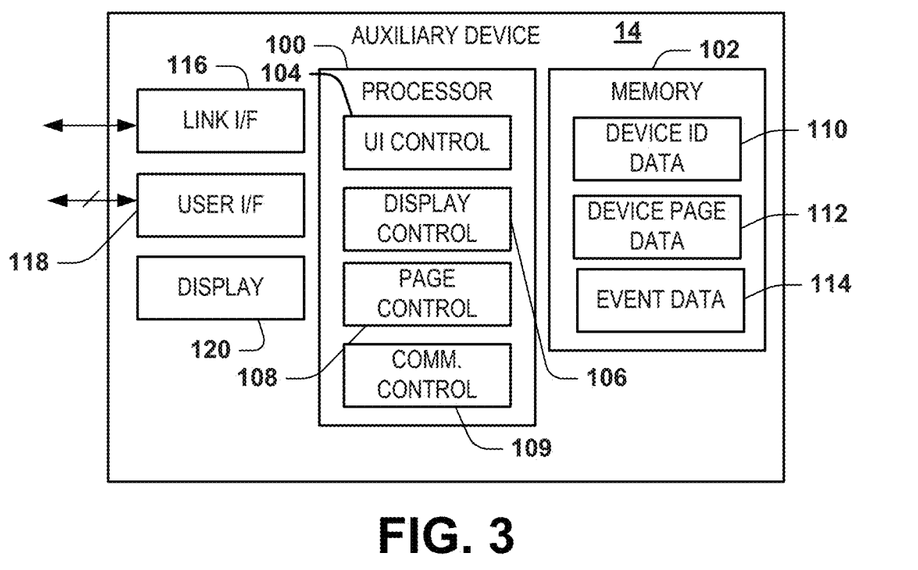
FIG. 3 depicts an example of an auxiliary device that can be configured with one or more virtual interactive objects.

FIG. 3 depicts an example of an auxiliary device 14 that can be connected to a host device 12 such as disclosed herein. In the example of FIG. 3, the auxiliary device 14 includes a processor 100 and memory 102. The processor 100 is configured to access the memory 102 for accessing data and executing instructions on the processor. In the example of FIG. 3, by way of example, the processor can execute a user interface (UI) control function 104, a display control function 106, a page control function 108 and a communication function 109. The memory 102 can store corresponding device ID data 110, device page data 112, and corresponding event data 114.

The device ID data 110 can include an enumerated device ID for the auxiliary device 14 for uniquely identifying each auxiliary device that may be connected to the host device 12. The device ID can be a hardware encoded identifier (e.g., by the manufacturer) or it can be specified by the host device 12 in response to a given auxiliary device 14 connecting to the host device and registering for operation. For example, the communication function 109 can send or receive messages via a link interface 116 that is connected to a host device via the communication link (e.g., according to a communication protocol).

By way of example, in response to connecting the auxiliary device 14 to the host device via the communication link, as part of a registration and/or power up process, the communication function 109 can send an initial notification (e.g., announcement) request via the link interface 116. The initial request can advertise or announce a device ID for the auxiliary device address. For instance, the memory 102 can be preprogrammed with a specified port and IP address for the host device (e.g., a generic host device IP address), and each host device 12 monitors such IP address and port to enable the device detection function 66 to detect when auxiliary devices have been connected. The request can also include its device ID stored in the device data, if preprogrammed, in the auxiliary device 14, or the device ID can be provided by the host in response to the request. As an example, the communication function 109 can control the link interface 116 provide the request using a TCP (transmission control protocol) connection that is established between the auxiliary device 14 and the host device 12. In response to the request, the host device can provide a corresponding response that includes virtual page configuration information, such as specifying how many auxiliary devices exist in the system as well as a sequence identifier for this auxiliary device 14 within the system. The enumerated device sequence identifier can be stored as part of the device ID data 110.

As part of the configuration process, the host device can further send virtual page data to each of the auxiliary devices that have been connected to the communication link. The auxiliary device 14 thus receives configuration messages that specify to which sequence ID each respective page is being assigned, and the auxiliary device 14 having such sequence ID can in turn receive, access and store the identified virtual page data structure in the device data page 112. The given auxiliary device 14 thus can employ the sequence identifier (assigned by the host device) to determine which one or more pages will be available and active for the given auxiliary device 14. As mentioned, the device data page 112 in a given auxiliary device 14 can store one or more virtual pages depending upon the distribution instructions provided by assignment control 70 of the host device 12.

Since a given auxiliary device 14 can include one or more available virtual pages, the page control 108 controls which virtual page is active at a given time at the auxiliary device. When more than one page is available based on device page data 112, a user can select which page to be active in response to a user input received via a user interface 118. The user interface 118 can receive instructions and signaling from any number of user interface components associated with the auxiliary device 14. For example, user interface components can correspond to physical buttons, buttons provided via a GUI or the like. The auxiliary device 14 can also include a display 120 that can display graphics, texts or other items (e.g., icons or the like) associated with the user interface components. The display control 106 generates the information in the display according to parameters stored for the active page. As disclosed herein, the parameters for the active page can be modified in response to event update messages from the host device.

By way of further example, in response to activation of a user interface component being received via user interface 118, the communication function 109 can send a corresponding event signal to the host device via the link interface 116. The communication function 109 can provide the event signal to specify the sequence identifier and device ID for the auxiliary device 14, the active page on which the user interface component that was activated resides and the indication of the numeric or other identifier for the activated user interface component (e.g., button). In response, the auxiliary device 14 can receive an event update signal via the link interface 116 indicating the status of one or more user interface components and/or display functions to be provided at the auxiliary device 14. The display control 106 thus can control the display 120 to indicate a change in status at a specified spatial location on the display such as adjacent a given user interface component. The UI control 104 can also control one or more the activated user interface component in response to the event update signal received via the link interface 116. For instance, each button can include or be linked to a multi-color LED that can be illuminated a selected color (e.g., red or green) or be non-illuminated to indicate the current status for the event or activity associated with each respective button.

Updates can be in response to user inputs at the auxiliary device, as mentioned above, or more generally in response to changes in status that may be detected by the host device or another device or service to which the host device is connected. For example, if a given user interface component (e.g., button) is associated with a given endpoint, in response to that endpoint being on a call, the system can provide a corresponding status identifier to one or more host devices to indicate an on-call or other appropriate status associated with such end point device. The status identifier can be propagated through the system and to the corresponding user interface component to provide the appropriate color of the user interface component or otherwise indicate the status for a specified individual endpoint.

The host device 12 can also provide status information (e.g., as part of the update data via the link 16 of FIG. 1) to indicate status of each user interface component associated with virtual pages implemented on each respective auxiliary device. For the example where the auxiliary device includes user interface buttons to select an active virtual page, the buttons can be controlled in a predefined manner to indicate the status of each page, such as shown in the following table:

| LED COLOR | STATUS DESCRIPTION |
| --- | --- |
| Green | The page of programmed buttons is currently active (in focus). |
| Amber | The page of programmed buttons is accessible from the current device, but another page is currently active. Press this button to select the page (will become active and LED turn green). |
| Blinking Amber | The page of programmed buttons is accessible from the current device, and one or more extensions with a programmed button on the page has a call. Press this button to select the page. |
| Unlit | The page of programmed buttons is accessible from another auxiliary device in the sequence of auxiliary devices 14. |

By way of further example, FIGS. 4-7 demonstrate examples of different numbers of auxiliary devices implemented as button boxes (e.g., key expansion modules) for a telecommunication system. In the examples of FIGS. 4 through 7 each of the auxiliary devices 150 is demonstrated as being the same configuration and, for simplicity of explanation identical reference numerals refers to same parts or components of the auxiliary devices in each of the figures. For purposes of simplicity of explanation, it is presumed that there are four available virtual pages in each of the examples of FIGS. 4-7.

Figure 4:
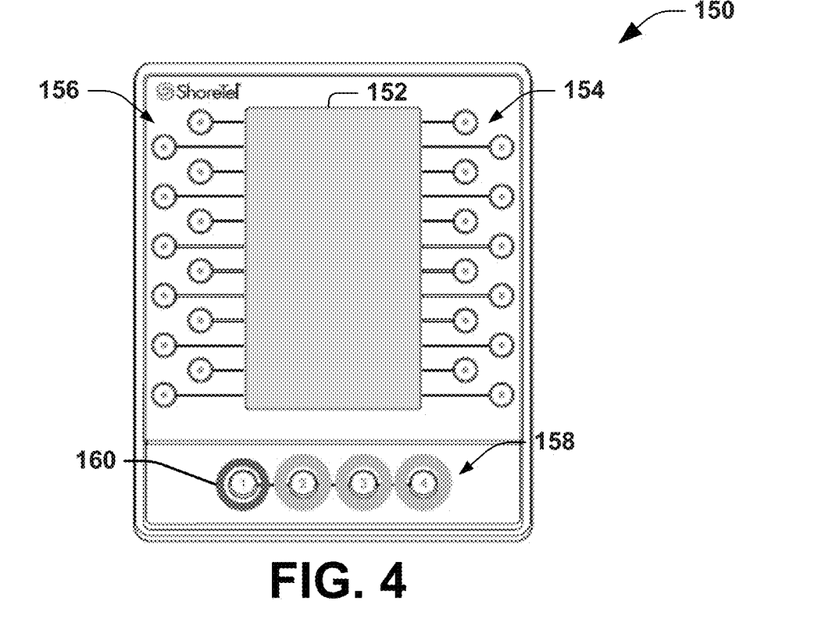
FIG. 4 depicts an example of an auxiliary expansion module having a first configuration.

In the example of FIG. 4, a single auxiliary button box device 150 is demonstrated configured to implement a plurality of four virtual pages one of which can be active a given time. The auxiliary device 150 includes a display 152 and an of user interface components, demonstrated as side buttons 154 and 156, arranged along the opposing lateral edges of the corresponding display 152. Along a corresponding lower edge below the display 152 are another set of user interface page selection buttons 158. Each of the user interface components 154, 156 and 158 thus can be assigned preprogrammed functions that can be implemented and executed in response to user activation thereof. For example, the display 152 can provide (based on device page data 112 and event data 114) icons, text (e.g., telephone numbers, labels assigned to programmable buttons) for performing functions, and background context. The display 152 may also provide current status information for the events and/or actions associated with the respective buttons 156 and 154) based on event data 114.

In addition to the information that is provided in the display 152, the individual user interface components 154, 156 and 158 can also be controllable to indicate status, such as by different color illumination depending upon status information provided from a host device. For instance, unlit can indicate inactivity where as red can indicate activity or on call and green can indicate an active call. Additionally, for the page selection user interface components 158 one of the buttons can be differentiated from the others (e.g., by color coded illumination) to indicate which of the respective virtual pages is active for the device 150. In the example of FIG. 4, a darker or different color coded ring 160 around the left-most button demonstrates that virtual page 1 is active for the device 150, whereas the other buttons are demonstrated in different colors to indicate their availability but currently inactive status. Information and user interface components associated with each of the different virtual pages thus can be accessed in response to activation of the corresponding one of the other buttons 158.

Figure 5:
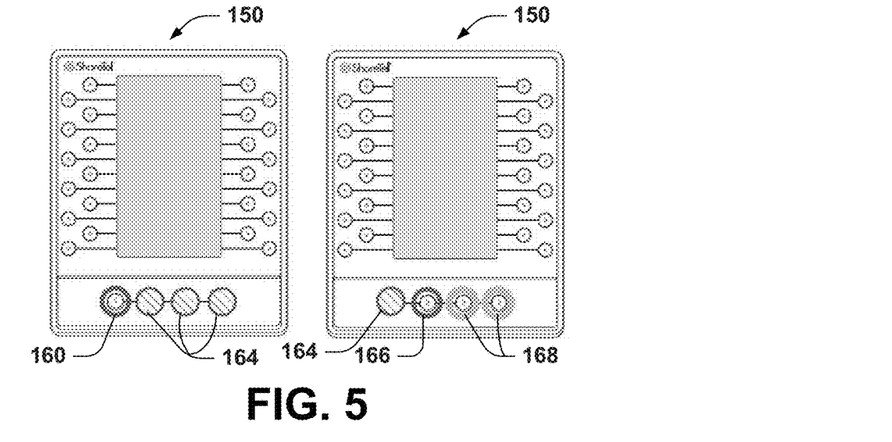
FIG. 5 depicts an example of two auxiliary expansion modules for a second configuration.

In the example of FIG. 5, there are two auxiliary button box devices 150. Each of the auxiliary devices 150 includes a different active virtual page. In the example of FIG. 5, the left-most auxiliary device has an active page 1 demonstrated by illumination of button 160, whereas the other buttons 164 are grayed out (indicated by cross-hatching). Thus, the grayed out buttons 164 indicate the unavailability of accessing additional pages via this particular auxiliary device. Instead, the second device (on the right-hand side) has virtual page 2 indicated as currently being active, indicated at 166, and the first button is demonstrated as being grayed out (indicated by cross-hatching 164) to indicate that virtual page 1 is unavailable at such device. Button 166, which can be associated with virtual page 2, is demonstrated as being active by the differentiated illumination or other indication at such device. The remaining two buttons 168, corresponding to virtual pages 3 and 4, are demonstrated with different illumination indicate that such pages are available but currently inactive on such device.

Figure 6:
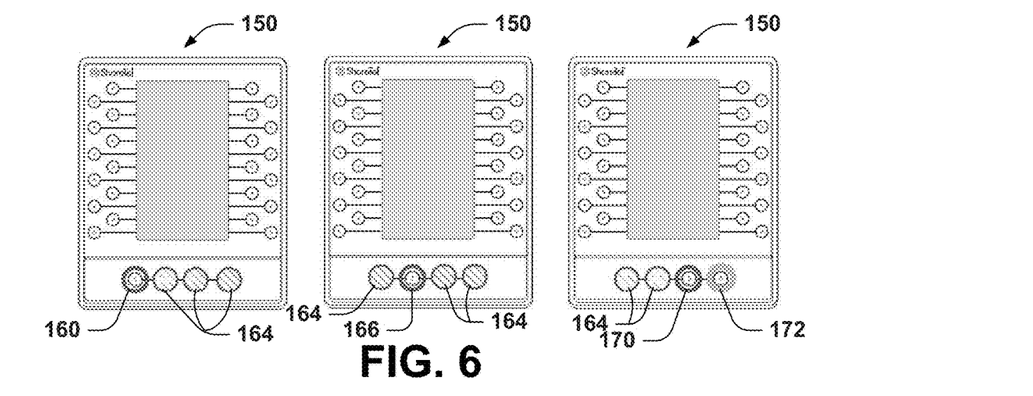
FIG. 6 depicts an example of three auxiliary expansion modules for yet another configuration.

In FIG. 6, there are three auxiliary button box devices 150 each of which has been allocated different virtual pages for operation thereon by a host device according to assignment data as disclosed herein. Similar to the previous examples of FIGS. 4 and 5, in the example of FIG. 6, the left-most or first auxiliary device has the first virtual page available as demonstrated by UI component 160. The other buttons on such device have been deactivated as indicated by cross hatching demonstrated at 164. The middle auxiliary button box device has its second button indicated as being active, demonstrated at 166, where the other virtual pages are inaccessible and unavailable at such device, as indicated by cross hatching at 164. The right-most auxiliary device 150 has the third virtual page active, demonstrated at 170, with the fourth virtual page being available and accessible in response to activation of the button, demonstrated at 172.

Figure 7:
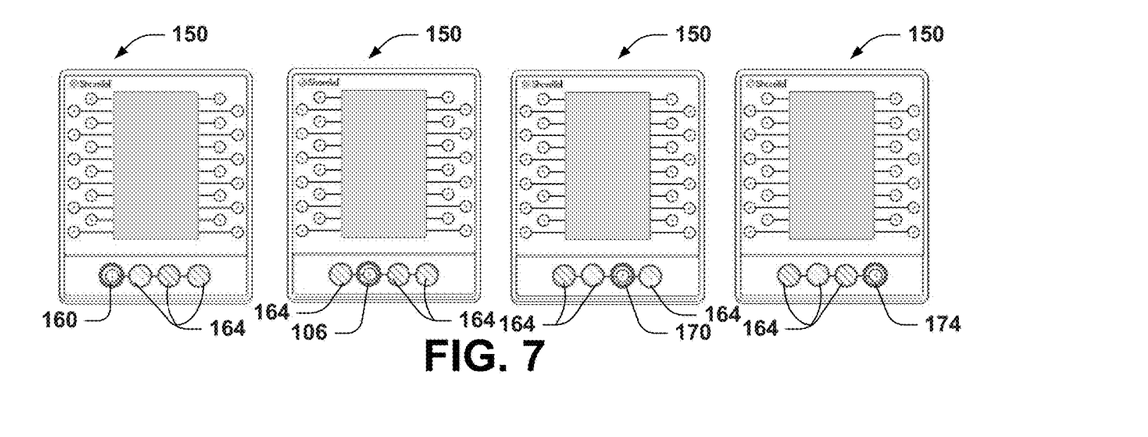
FIG. 7 depicts an example of four auxiliary expansion modules for still another configuration.

FIG. 7 demonstrates yet another configuration where the four virtual pages are distributed across four auxiliary devices 150. Thus, each auxiliary device has only a single active and available virtual page demonstrated on each of the auxiliary devices at 160, 166, 170 and 174, respectively. Each of the other buttons have deactivated at the respective devices, demonstrated by cross-hatching at 164, so that each of the virtual pages remain static until or unless the configuration of auxiliary devices connected to the host device might change, such as by adding or removing an auxiliary button box device, as disclosed herein. Updates can thus be distributed to each of the auxiliary devices via the communication link to demonstrate status changes and other information that may be relevant to the user interface components and associated events and functions available at each respective auxiliary device.

Figure 8:
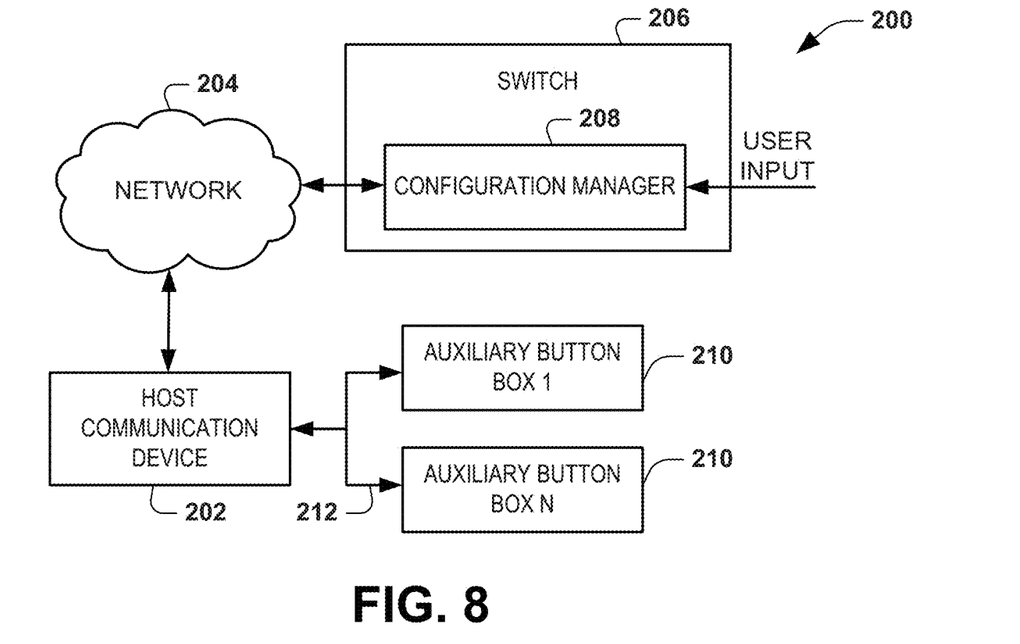
FIG. 8 depicts an example of a communication system in which a plurality of auxiliary devices are associated with a given host telephone device.

FIG. 8 depicts an example of a system that can implement automatic configuration of virtual objects in the context of a telecommunication system 200. The telecommunication system 200 includes one or more host communication devices (e.g., corresponding to host device 12 disclosed herein) 202 connected to a network 204 via a corresponding interface such as disclosed herein. The network 204 can be implemented as a communication network that can include local area networks, wide area networks, as well as public switch telephone networks, to enable communication between the host device 202 and one or more other endpoints that may be connected to the network 204. The communication links to and from the network 204 can be physical connections or wireless (e.g., terrestrial- or satellite-based transceivers). As one example, the network 204 is a packet-switched network such as an IP-based wide or metropolitan area network that uses Ethernet or other communication protocols.

The system 200 also includes one or more switches 206 to control routing of communications with respect to the communication device 202 and other devices that may be connected in the system 200. The switch 206 can employ a configuration manager 208 for configuring one or more functions of the communication system 200, such as including but not limited to programming virtual pages for each host communication device 202. For example, the configuration manager 208 can be implemented as including one or more web pages that provide user input screens or other document forms that can be modified to program button functions in response to user inputs. The web pages can be displayed on a web browser and store virtual page configuration parameters in memory in response to the user input. The resulting virtual pages can be utilized to program functions of programmable buttons on the host device 202 as well as one or more auxiliary button boxes (e.g., corresponding to auxiliary device 14 disclosed herein) 210 that may be connected to the host device.

In the example of FIG. 8, the auxiliary button boxes 210 are each connected directly to the host 202, such as via the communication link 212. In response to saving or otherwise causing the information programmed into the virtual pages to be saved, the configuration manager 208 can send a corresponding message (e.g., via an IP protocol) to the host device 202 via the network 204. For example, when the host communication device 202 registers with the switch 206, the entire data structure that has been programmed in response to the user input for each of the virtual pages can be provided to the host device 202. The corresponding data structure can be stored in memory at the host device to instantiate a programmable button class object for each of the virtual pages as disclosed herein, which instances can be assigned and distributed to the auxiliary button boxes 210 as appropriate.

Figure 9:
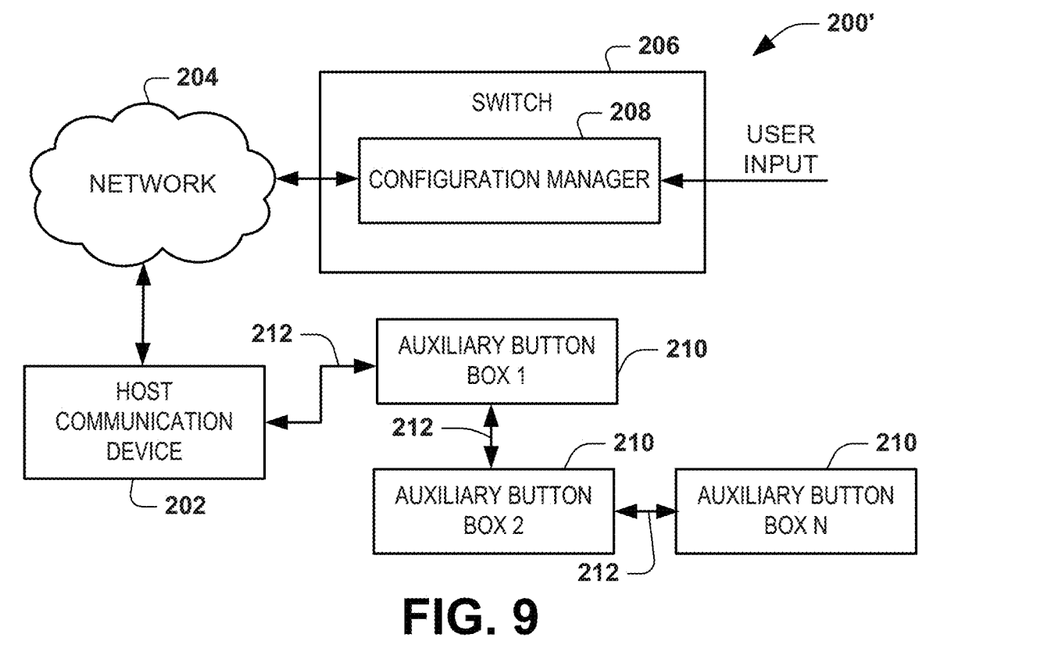
FIG. 9 depicts an example of another communication system in which a plurality of auxiliary devices associated with a given host telephone device according to another configuration.

FIG. 9 demonstrates another example of a communication system 200' in which identical numbers refer to similar components demonstrated with respect to FIG. 8. In the example of FIG. 9, instead of each of the auxiliary button boxes being connected directly to the host device 202 via the communication link 212, the auxiliary button boxes 210 are connected in a different physical network topology. In particular, the auxiliary button boxes 210 are in a daisy chain arrangement in which a first button box 210 in the sequences (box 1) is connected directly to the host device 202, a second box (box 2) is connected to the box 1 and so on until an ultimate box (box N) is connected to the pen-ultimate box (N−1). As mentioned herein, there can be any number N of button boxes 210 where N is a positive integer.

Figure 10:
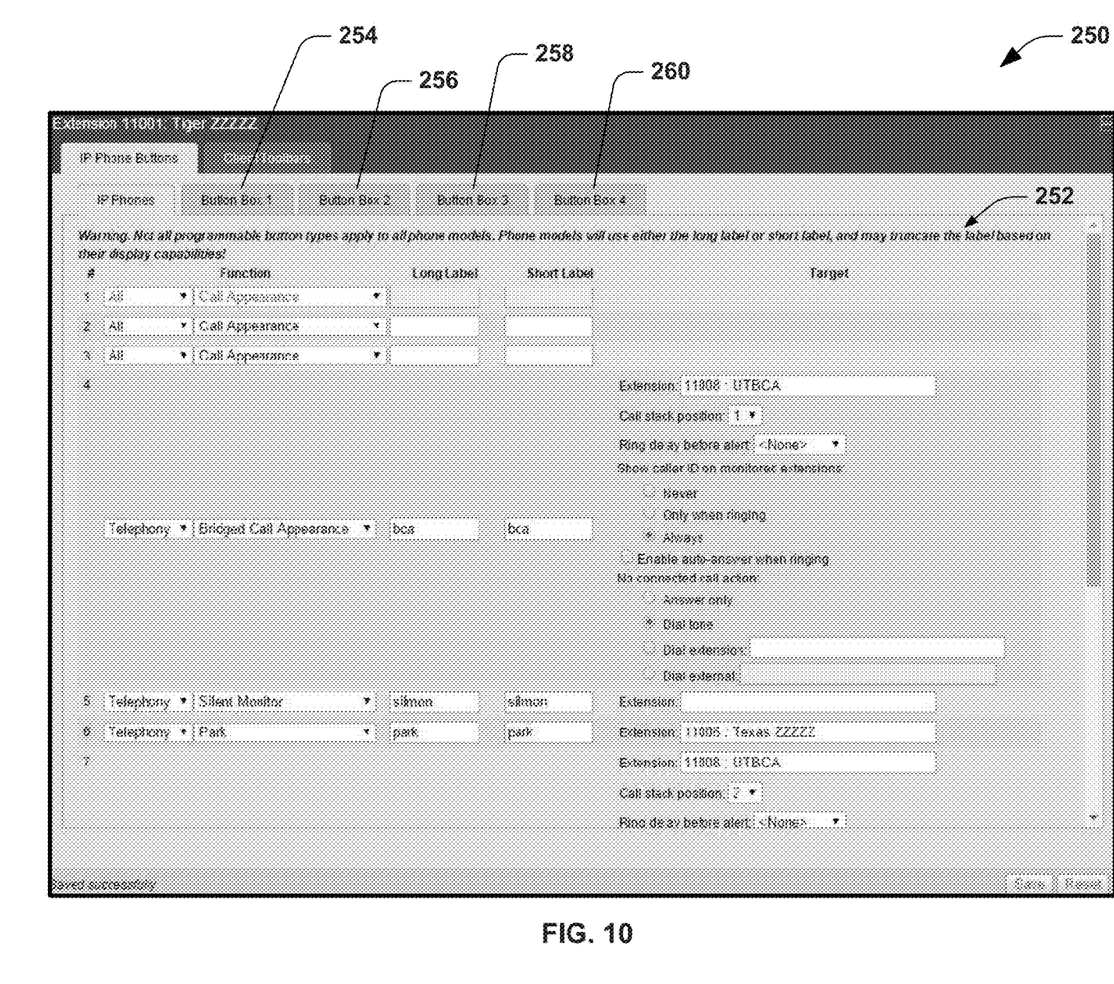
FIG. 10 depicts an example of a screen shot for a configuration manager that can be utilized to program user interface components for a plurality of virtual pages.

FIG. 10 demonstrates an example of a graphical user interface (GUI) 250 that can correspond to the configuration manager function that is utilized for programming parameters for a plurality of virtual pages. The GUI 250 thus can include a plurality of forms (e.g., web documents), each providing GUI elements to program events and actions associated respective user interface components. In the example of FIG. 10, the first tab, which is demonstrated as an active web document 252, corresponds to events and actions for programming user interface components associated with the host device. Additional tabs, demonstrated at 252, 254, 256, 258 and 260, can be activated to select and access documents for programming parameters for other virtual pages. That is each tab 252-260 can provide a corresponding set of programmable user interface components (e.g., buttons) and corresponding labels and functions that can be assigned and stored to define parameters for each respective virtual page.

Figure 11:
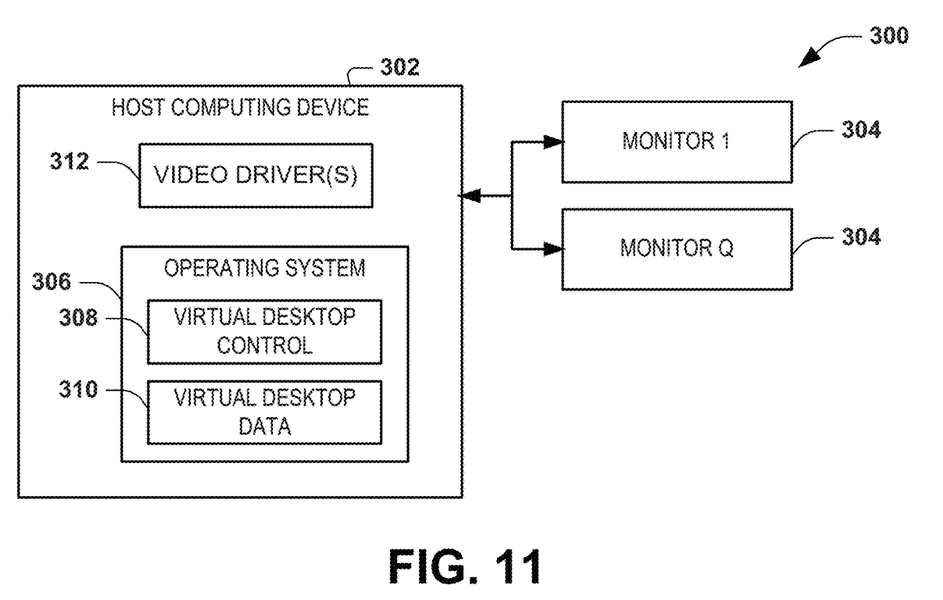
FIG. 11 depicts an example of another system for automatically configuration of virtual objects implemented on a plurality of monitors.

As mentioned, the automatic configuration of virtual objects for implementing on physical devices is not limited to button boxes in a telecommunication system. Thus, FIG. 11 depicts an example of another system that can be utilized for automatically configuring virtual objects in the context of a computing system 300 implementing a plurality of virtual desktop objects. In the example of FIG. 11, the computing system 300 includes a host computing device 302 and a plurality of auxiliary physical monitor devices 304, demonstrated as monitors 1 through Q (where Q is positive integer denoting the number of monitors connected to the computing device).

In the example of FIG. 11, the host computing device includes an operating system 306 that employs a virtual desktop control 308 that can be utilized to configure a plurality of virtual desktops among one or more monitors 304 based on virtual desktop data 310. Similar to other virtual pages and other virtual objects disclosed herein, the virtual desktop control 308 can determine the number of physical monitors 304 connected to the host computing device and in turn automatically assign and distribute one or more virtual desktops to each connected monitor 304 based upon the number of monitors that are connected. The sequence and arrangement of monitors 304 can also be determined by the host computing device (e.g., automatically or in response to a user input) to specify which virtual desktops should be assigned to each respective monitors 304. The virtual desktop control 308 thus can generate corresponding virtual desktop data 310 to control the assignment of the virtual desktops to the respective monitors.

The operating system 306 can provide instructions to a video driver 312 to control which of each of the virtual desktop is presented for display at a given monitor. A corresponding user interface or other user input device (e.g., keyboard, mouse or the like) can be utilized to control interactions with the available functions, methods and application programs associated with each respective virtual desktop that is currently active in one of the monitors 304. In this way, each monitor 304 can display and provide user interactions with functions and applications associated with a single given virtual desktop that is currently active.

By way of example, if the user has four virtual desktops and one physical monitor, then the user can switch between each of the virtual desktops, such as via keystrokes or other user input methods, and the operating system can in turn toggle between the different virtual desktops accordingly. If the user attaches a second monitor 304, the first monitor can display a fixed or primary virtual desktop while the second monitor is added can be configured and controlled to display the remaining other desktops. For example, a user can switch between the three remaining virtual desktop via the second monitor 304 in response to a user input toggling selection. In other examples, the virtual desktop control 308 can determine a different distribution of virtual desktops among the different monitors 304 detected as being connected to the host computing device 302, such as disclosed herein. As additional monitors are connected to the host computing device 302, the virtual desktop control 308 can in turn reallocate and distribute the virtual desktops among the set of monitors that are connected to the host computing device in a similar manner.

Figure 12:
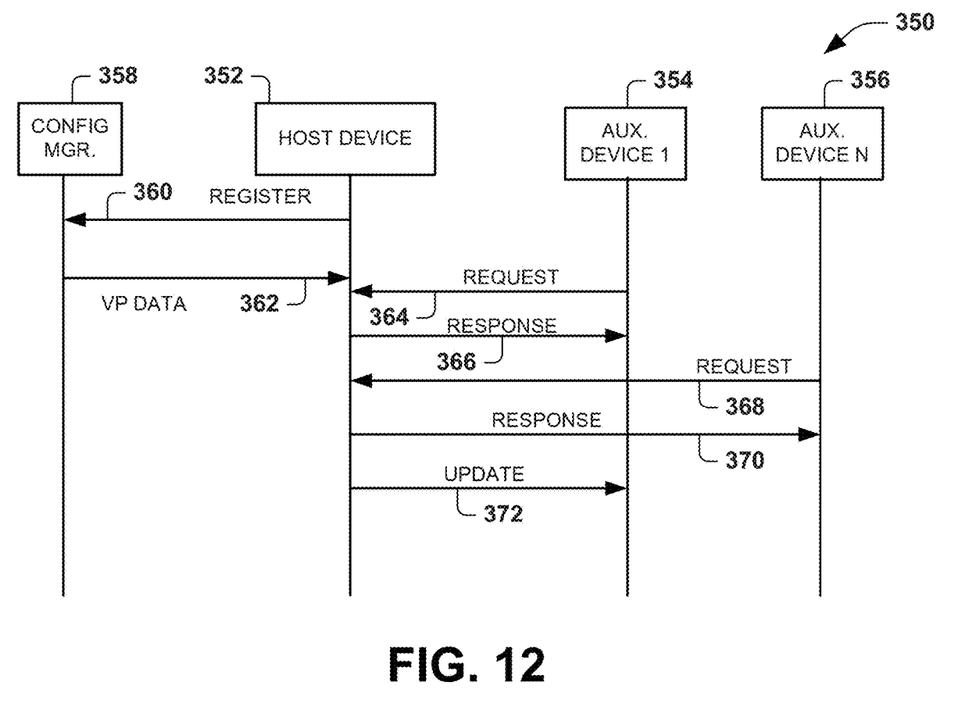
FIG. 12 depicts a signaling diagram demonstrating an exchange of signals for configuring a plurality of auxiliary devices.

FIG. 12 is an example of system 350 demonstrating an example of signaling between devices and applications associated with automatically configuring virtual interactive objects disclosed herein. In the example of FIG. 12, the system 350 includes a host device (e.g., host device 12 or 202) 352, and a plurality of auxiliary devices (e.g., device 14 or 204) 354 and 356, where N is a positive integer denoting the number of auxiliary devices. Also demonstrated is a configuration manager 358 that can be implemented according to the configuration manager demonstrated with respect to FIGS. 8 and 9 (e.g., part of a switch or other control system).

In response to connection of the host device 352 to a corresponding network system 350, at 360, the host device can register with a switch device implementing the configuration manager 358. In response, at 362, the configuration manager 358 can send virtual page (VP) data (362) to the host device 352. The VP data can be stored in memory of the host device 352 as a corresponding data structure. For example, the host device can convert the virtual page data for each respective virtual page into corresponding instances of a virtual page class object. In response to an auxiliary device 354 being connected to the host device 352, at 364, the auxiliary device can be programmed to provide a corresponding request to the host device 352 via a communication link. The request can include an indication of a device ID associated with the auxiliary device 354. The host device can send a device response at 366, which can specify relevant virtual page configuration information for the system 350 such as including an indication of how many (one or more) auxiliary devices are currently connected to the host device 352 and a sequence identifier for the auxiliary device 354 among the connected auxiliary devices. The response 366 can also include virtual page configuration information that can be received and stored in the auxiliary device 354. The virtual page configuration information can include one or more instance for each of the virtual pages assigned to the auxiliary device 354 to enable activation and use of events and actions for the one or more virtual pages as determined by the host device 352.

In response to another auxiliary device 356 connecting to the host device 352 via the communication link, at 368, the new auxiliary device can send a corresponding request to the host device. The request 368 can be the same or similar to the request 364, being sent to a predetermined port and address that is preprogrammed in the auxiliary device 356. In response to the request 368, the host device 352 can determines the number of auxiliary devices and sequence, based on which an updated assignment of virtual pages is determined. At 370, the host device 352 can issue a response to the auxiliary device 356 specifying the number of auxiliary devices in the system 350 and specifying the sequence ID for auxiliary device 356. Additionally, the response can include the virtual page data assigned to the new auxiliary device 356 according to its sequence ID and the number of its auxiliary devices. Additionally, in response to the reassignment of virtual pages resulting from the request 368, at 372, the host device 352 can provide a configuration update to each previously configured auxiliary device 354. The update 372 thus can result in a corresponding change with respect to which virtual page(s) are available at auxiliary device 354. In some examples, such as where a virtual page that is active page on the device is re-assigned to the other device 356, a different active page at the device 354 may result from the addition of auxiliary device 356 to the system 350. Once the auxiliary devices are configured with virtual pages, as disclosed herein, the host device 352 can provide event and status updates to user interface components associated with each of the auxiliary devices 354 and 356.

What have been described above are examples. It is, of course, not possible to describe every conceivable combination of components or methodologies, but one of ordinary skill in the art will recognize that many further combinations and permutations are possible. Accordingly, the disclosure is intended to embrace all such alterations, modifications, and variations that fall within the scope of this application, including the appended claims. As used herein, the term "includes" means includes but not limited to, the term "including" means including but not limited to. The term "based on" means based at least in part on. Additionally, where the disclosure or claims recite "a," "an," "a first," or "another" element, or the equivalent thereof, it should be interpreted to include one or more than one such element, neither requiring nor excluding two or more such elements.

What is claimed is:

1. A host device, comprising:
   memory to store data and instructions, the data including virtual page assignment data that specifies a plurality of discrete virtual user interactive objects; and
   at least one processor to access the memory and execute the instructions stored therein, the instructions comprising:
      assignment logic to at least one discrete virtual user interactive object of the plurality of discrete virtual user interactive objects to at least one auxiliary physical device based the virtual page assignment data that is determined based on a number of auxiliary physical devices connected to the host device via a communication link, each of the discrete virtual user interactive objects defining a set of preprogrammed discrete functions to be executed by the at least one processor in response to the host device receiving an event signal via the communication link representing activation of a corresponding discrete virtual user interactive object at a respective auxiliary physical device; and
      distribution logic to provide via the communication link the assigned at least one discrete virtual user interactive object to the at least one auxiliary physical device based on the virtual page assignment data to enable activation of the at least one discrete virtual user interactive object at the at least one auxiliary physical device;
   wherein the host device comprises a telephone and the at least one auxiliary physical device comprises at least one key expansion module, and each of the plurality of discrete virtual user interactive objects comprises a virtual page of preprogrammed user interface components that define actions for the at least one key expansion module.

2. The host device of claim 1, wherein the instructions further comprise detection logic to detect each auxiliary physical device that is connected to the host device via the communication link and to assign each detected auxiliary physical device a unique identifier in response to signaling between each auxiliary physical device and the host device via the communication link.

3. The host device of claim 2, wherein the detection logic automatically determines the number of auxiliary physical devices connected to the host device via the communication link.

4. The host device of claim 2, wherein the detection logic determines an enumerated sequence identifier for each auxiliary physical device that is connected to the host device via the communication link, the host device assigning the enumerated sequence identifier as part of the unique identifier for each respective auxiliary physical device, each auxiliary physical device employing an associated unique identifier to determine which of the discrete virtual user interactive objects are available.

5. The host device of claim 1, wherein:
   the at least one auxiliary physical device comprises a plurality of auxiliary physical devices; and
   the instructions further comprise an assignment control to determine a distribution and an assignment of the plurality of discrete virtual user interactive objects to each respective auxiliary physical device depending on the number of the plurality of auxiliary physical devices and a sequence of the plurality of auxiliary physical devices, such that each of the plurality of auxiliary physical devices is assigned to implement a different set of the plurality of discrete virtual user interactive objects.

6. The host device of claim 1, further comprising a link interface to provide bidirectional communication between the host device and each auxiliary physical device via the communication link.

7. The host device of claim 1, wherein:
   the at least one auxiliary physical device comprises a plurality of auxiliary physical devices; and
   the instructions further comprise update logic to provide an update event message to a given one of the plurality of auxiliary physical devices via the communication link in response to a user input at the given one of the plurality of auxiliary physical devices or a monitored activity.

8. The host device of claim 7, wherein the update event message includes an indication of which of the plurality of discrete virtual interactive objects is active at the given one of the plurality of auxiliary physical devices.

9. The host device of claim 1, wherein:
   the at least one auxiliary physical device comprises a plurality of auxiliary physical devices; and
   the instructions further comprise an event processor to receive a device event signal in response to a user input associated with a given one of the plurality of auxiliary physical devices, the event processor to execute instructions for a corresponding action in response to the device event signal.

10. The host device of claim 9, wherein the user input comprises activation of a user interface component, the device event signal specifying an enumerated identifier for the given one of the plurality of auxiliary physical devices, an identifier for the activated discrete virtual user interactive object and an identification for the user interface component that is activated in response to the user input.

11. The host device of claim 1, further comprising a network interface to communicate with a configuration manager via a network, the configuration manager programmed to provide configuration data to the host device via the network to define parameters for each of the plurality of discrete virtual user interactive objects in response to another user input.

12. The host device of claim 1, wherein:
   the at least one auxiliary physical device comprises a plurality of auxiliary physical devices;
   the instructions further comprise detection logic to determine an order of connection that each of the plurality of auxiliary physical devices were connected to the host device via the communication link; and the assignment logic is to assign the plurality of discrete virtual user interactive objects to the plurality of auxiliary physical devices based on the number of the plurality of auxiliary physical devices connected to the host device and further based on the order of connection that each of the plurality of auxiliary physical devices were connected to the host device via the communication link the distribution logic is to provide via the communication link each auxiliary physical device of the plurality of auxiliary physical devices one or more discrete virtual user interactive objects of the plurality of discrete virtual user interactive objects based on the assigning.

13. The host device of claim 1, wherein:

the at least one discrete virtual user interactive object comprises first and second discrete virtual user interactive objects;

the at least one auxiliary physical device comprises a first auxiliary physical device and is assigned the first and second discrete virtual user interactive objects;

the instructions further comprise detection logic to detect a connection of a second auxiliary physical device to the host device via the communication link; and the assignment logic is to reassign one of the first and second discrete virtual user interactive objects to the second auxiliary physical device; and the distribution logic is to:
provide one of the reassigned first and second discrete virtual user interactive objects to the second auxiliary physical device; and
provide one of the first and second discrete virtual user interactive objects not assigned to the second auxiliary physical device to the first auxiliary physical device.

14. The host device of claim 1, wherein:

the at least one auxiliary physical device comprises a first auxiliary physical device and a second auxiliary physical device;

the at least one discrete virtual user interactive object comprises first and second discrete virtual user interactive objects;

the assignment logic is to assign the first discrete virtual user interactive object to the first auxiliary physical device and assign the second discrete virtual user interactive object to the second auxiliary physical device based on the virtual page assignment data; and the distribution logic is to provide the first discrete virtual user interactive object to the first auxiliary physical device to enable activation of the first discrete virtual user interactive object at the first auxiliary physical device and to provide the second discrete virtual user interactive object to the second auxiliary physical device to enable activation of the second discrete virtual user interactive object at the second auxiliary physical device.

15. The host device of claim 14, wherein:

the instructions further comprise detection logic to detect a disconnection of the second auxiliary physical device from the host device via the communication link;

the assignment logic is to reassign the second discrete virtual user interactive object to the first auxiliary physical device; and the distribution logic is to provide the first and second discrete virtual user interactive objects to the first auxiliary physical device to enable the activation of the first and second discrete virtual user interactive objects at the first auxiliary physical device.

16. A system, comprising:

at least one auxiliary device comprising a plurality of user interface components responsive to user inputs; and a host device comprising:
a link interface to communicate with the at least one auxiliary device via a communication link;
wherein the host device comprises:
assignment logic to assign at least one of a plurality of virtual interactive pages to the at least one auxiliary device based on a number of auxiliary devices connected to the host device, each of the plurality of virtual interactive pages programmed to associate a discrete set of actions or events with specified user interface components of a respective auxiliary device to which a respective virtual interactive page is assigned; and
distribution logic to provide via the communication link the assigned at least one virtual interactive page to the at least one auxiliary device to enable activation of the at least one virtual interactive page at the at least one auxiliary device, the host device configured to execute a selected one of the actions or events in response to receiving a signal via the communication link from the at least one auxiliary device representing activation of a corresponding one of the plurality of user interface components at the at least one auxiliary device that is associated with the selected action or event;
wherein the host device comprises a telephone and the at least one auxiliary device comprises at least one key expansion module, and each of the plurality of virtual interactive pages comprises the discrete set of actions or events for the at least one key expansion module.

17. The system of claim 16, wherein the host device further comprises detection logic to detect each auxiliary device that is connected to the host device via the communication link and to assign each detected auxiliary device a unique identifier.

18. The system of claim 17, wherein the detection logic determines an enumerated sequence identifier for each auxiliary device that is connected to the host device via the communication link, the assignment logic to assign the enumerated sequence identifier as part of the unique identifier for each respective auxiliary device, each auxiliary device employing a respective unique identifier to determine which of the plurality of virtual interactive pages are available.

19. The system of claim 16, wherein:

the at least one auxiliary device comprises a plurality of auxiliary devices; and the host device further comprises an assignment control to determine a distribution and assignment of the plurality of virtual interactive pages to each respective auxiliary device of the plurality of auxiliary devices depending on the number of the auxiliary devices and a sequence of the plurality of auxiliary devices, such that each of the plurality of auxiliary devices is assigned to implement a different set of virtual interactive pages.

20. The system of claim 16, wherein the host device further comprises update logic to provide an update event message via the communication link to update status information associated with a given user interface component of the plurality of user interface components in response to a user input activating the given user interface component or a monitored activity.

21. The system of claim 16, wherein the host device further comprises an event processor to receive a device event signal via the communication link in response to a given user input activating a given user interface component of the plurality of user interface components, the event processor to execute instructions for a corresponding action or event in response to the device event signal.

22. The system of claim 21, wherein the device event signal comprises data specifying an enumerated identifier for the at least one auxiliary device implementing the given user interface component, an identifier for an active virtual interactive page and an identifier for the given user interface component that is activated in response to the given user input.

23. The system of claim 16 implemented as a communication system, wherein the host device comprises a telecommunication station, the at least one auxiliary device comprises at least one key expansion module, and each of the plurality of virtual interactive pages comprises preprogrammed user interface components that define actions or events for the at least one key expansion module.

24. The system of claim 16, wherein:
the at least one auxiliary device comprises a plurality of auxiliary devices;
a first auxiliary device of the plurality of auxiliary devices is configured to receive a first virtual interactive page of the plurality of virtual interactive pages and implement the first virtual interactive page, such that the first virtual interactive page is active; and
a second auxiliary device of the plurality of auxiliary devices is configured to receive second and third virtual interactive pages of the plurality of virtual interactive pages and implement one of the second and third virtual interactive pages in response to a user input at the second auxiliary device, such that one of the second and third virtual interactive pages is active.

25. A method comprising:
storing in memory of a host device a plurality of discrete virtual pages that each represents a different set of executable actions or events responsive to respective user inputs;
identifying each auxiliary device that is connected to the host device via a communication link, each auxiliary device including programmable user interface components;
determining, at the host device, assignment data that specifies which of the plurality of discrete virtual pages is assigned to each identified auxiliary device based on a number of auxiliary devices;
distributing to each identified auxiliary device, via the communication link, at least one discrete virtual page of the plurality of discrete virtual pages based on the determined assignment data to program each identified auxiliary device, such that each identified auxiliary device associates a respective set of the executable actions or events with respective user interface components according to the at least one discrete virtual page of the plurality of discrete virtual pages being implemented by a respective auxiliary device;
executing, at the host device, a selected one of the actions or events in response to the host device receiving an event signal from a given auxiliary device via the communication link representing activation of a corresponding user interface component at the given auxiliary device; and
wherein the host device comprises a telephone and each identified auxiliary device comprises at least one key expansion module, and each of the plurality of discrete virtual pages comprises the respective set of executable actions or events for the at least one key expansion module.

* * * * *